(12) United States Patent
Ueno et al.

(10) Patent No.: US 7,607,530 B2
(45) Date of Patent: Oct. 27, 2009

(54) TRANSFER CONVEYOR

(75) Inventors: Ichiro Ueno, Osaka (JP); Shogo Okamoto, Osaka (JP); Kenji Umezawa, Osaka (JP); Yousuke Sugawara, Osaka (JP); Susumu Kawano, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 3 days.

(21) Appl. No.: 11/935,561

(22) Filed: Nov. 6, 2007

(65) Prior Publication Data
US 2008/0116037 A1    May 22, 2008

(30) Foreign Application Priority Data
Nov. 22, 2006   (JP)   ............... 2006-315013

(51) Int. Cl.
*B65G 47/22*   (2006.01)

(52) U.S. Cl. ............... 198/345.3; 198/781.05; 193/35 A

(58) Field of Classification Search ............... 198/345.3, 198/463.4, 634, 460.1, 781.05; 193/35 A
See application file for complete search history.

(56) References Cited

U.S. PATENT DOCUMENTS 3,532,201 A * 10/1970 McConnell ............... 193/35 A
4,646,909 A * 3/1987 vom Stein ................ 198/460.1
5,213,189 A * 5/1993 Agnoff ..................... 193/35 A
6,234,292 B1 * 5/2001 Schut ....................... 193/35 A

FOREIGN PATENT DOCUMENTS

JP   2002-137819   5/2002

* cited by examiner

*Primary Examiner*—James R Bidwell
(74) *Attorney, Agent, or Firm*—Dann, Dorfman, Herrell and Skillman, P.C.; Henry H. Skillman

(57) ABSTRACT

A transfer conveyor which prevents collisions between works to be conveyed when the works to be conveyed or stored are carried on a conveyer track by a work support having a length shorter than the length of works to be conveyed, which permits reverse traveling during maintenance operations and the like. The collision preventing mechanism includes a sensing element which is biased into a contact position where it engages a leading work support on the conveyor track and is deflected, a sensing lever 132, which mounts the sensing element and pivots in accordance with the contacting/deflecting operation of the sensing element, and a stopper lever downstream from the sensing element, which is connected to the sensing element to be displaced into the path of travel of the next trailing work support when the sensing element is in the contacting position, The stopper lever limits the travel of the trailing work support to a predetermined storage conveying interval.

7 Claims, 12 Drawing Sheets

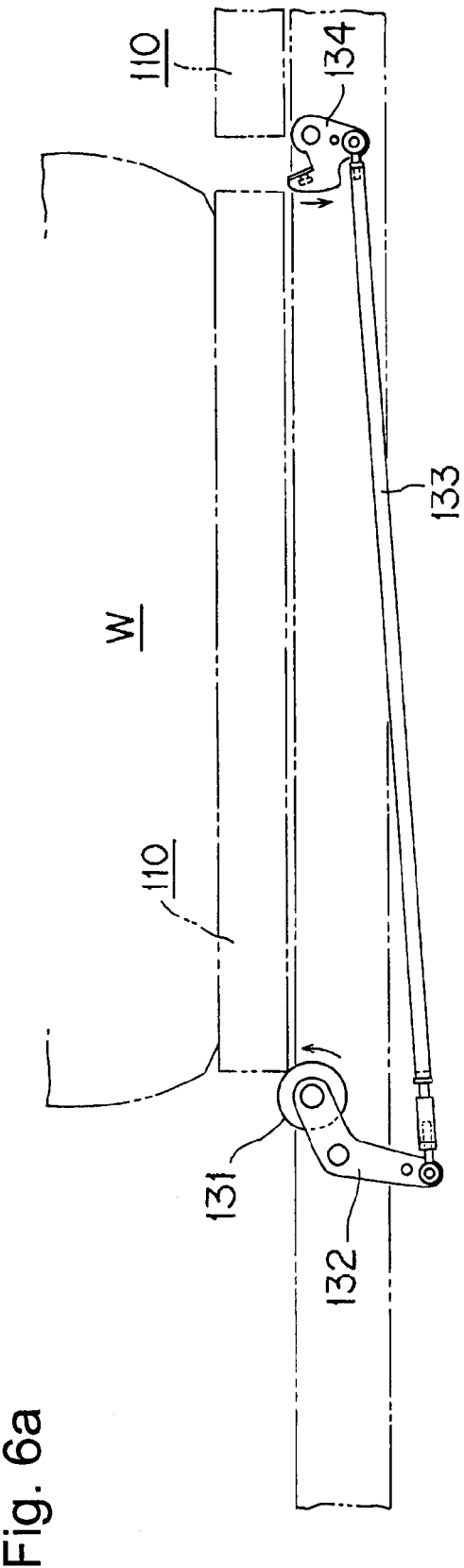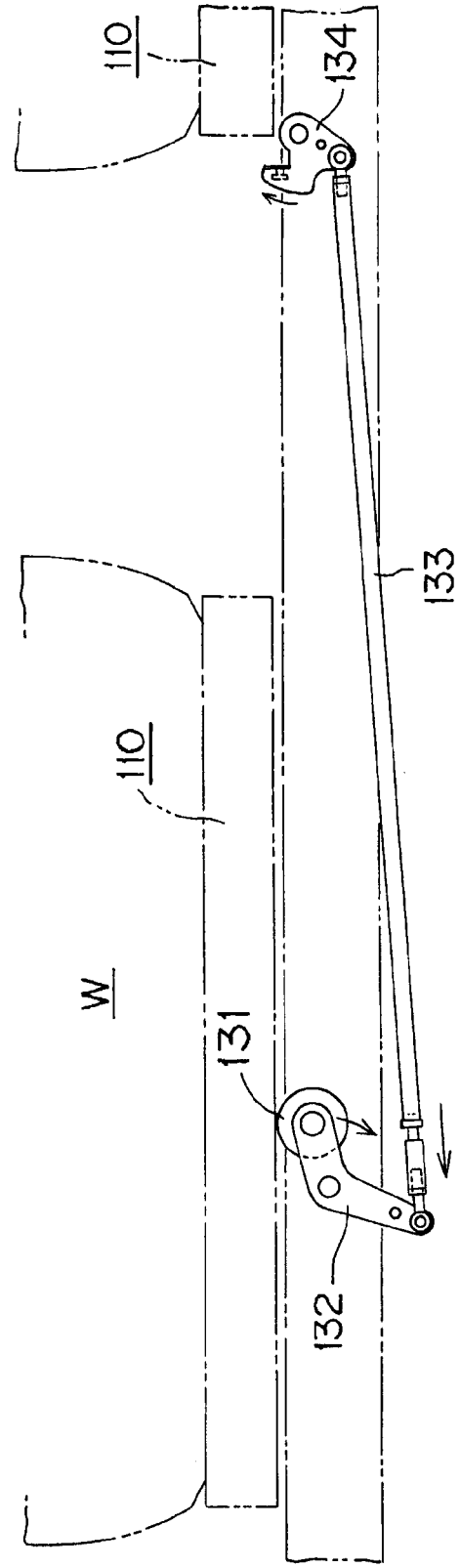

TRANSFER CONVEYOR

FIELD OF INVENTION

The present invention relates to a transfer conveyor for storage-conveying works to be conveyed, and more specifically relates to a transfer conveyor in which works to be conveyed such a car body or the like painted on a conveying line in a painting step are respectively mounted on a conveyor having a length shorter than the length of the works to be conveyed, they are storage-conveyed on a conveyor track in a drying step by an oven furnace and the collision between a leading work to be conveyed on the conveyor track and a trailing work to be conveyed on the conveyor's track is prevented.

BACKGROUND OF THE INVENTION

As a transfer conveyor for conveying works to be conveyed such as car bodies or the like in an factory, various transfer conveyors according to the forms of conveyors, which load works to be conveyed and construction shapes of the conveying lines and the like have been adopted.

Thus as shown in FIGS. 13 and 14, a conventional transfer conveyor 500 comprises a number of connected conveyor units 520 each of which sets the conveying pitch Lp (storage conveying gap) of a work W to be conveyed to a unit length L1, and conveys a conveying skid 510 of the length L2 shorter than the length Lw in a longitudinal direction of the work W to be conveyed. Further, the transfer conveyor 500 provides a magnetic material 512 to be detected on an end bottom surface portion on the conveying skid 510 side, arranges a magnetostrictive sensor 526 in a conveying direction on the conveyor unit 520 side and provides a number of driving rollers 524, which control the movement and stop of the conveying skid 510 in a conveyor unit 520 by a real time output signal, in the conveyor unit 520 so that the collision between a leading work W to be conveyed and the Trailing work W to be conveyed on a conveyor track is prevented. It is noted that the reference numeral 523 in FIG. 14 denotes a supporting bracket, which provides the conveyor unit 520 upright on a floor surface of a conveying passage at predetermined intervals, and the reference numeral 525 denotes a driving motor for driving a driving roller 524 (see for example Patent Reference 1) [Patent Reference 1] Japanese Laid-Open Patent Publication No. 2002-137819 (page 1, FIG. 5)

PROBLEMS TO BE SOLVED BY THE INVENTION

However, since the above-mentioned conventional conveyor 500 includes a number of driving rollers 524, which are controlled by a real time output signal of the magnetostrictive sensor 526, there were problems in driving control that break of power supply of a control circuit, disconnection of a control wiring, a malfunction of a control circuit and the like liable to occur unexpectedly.

Further, since the collision between a leading work W to be conveyed and the trailing work W to be conveyed on a conveyor track is prevented by specified arrangement of a magnetic material 512 to be detected and a magnetostrictive sensor 526, the work W to be conveyed cannot be reversely traveled, and there was a problem in maintenance that the transfer conveyor 500 cannot be sufficiently used in a maintenance operation during an abnormal conveyance.

Accordingly, the present invention is to solve the above-mentioned prior art problems or to provide a transfer conveyor, in which collisions between works to be conveyed when the works to be conveyed are storage-conveyed can be easily and reliably prevented by use of a conveyor having a length shorter than the length of works to be conveyed in spite of a driving control circuit and a reverse traveling can be easily attained during maintenance operation and the like.

MEANS FOR SOLVING THE PROBLEMS

The invention solves the above-mentioned problems by a transfer conveyor comprising a work support driving mechanism, which mounts a number of works to be conveyed on a conveyor having a length shorter than the length of the article to be conveyed or transferred in a transfer path and is storage-conveyed in the path on a conveyor track, and a collision preventing mechanism, which prevents collision between a leading work to be conveyed, and the trailing work to be conveyed, which are storage-conveyed characterized in that said collision preventing mechanism includes a sensing roller, which comes into contact with a leading work support in the transfer path on the conveyor track and is deflected, a sensing lever, which rotatably pivots said sensing roller at one end and at the same time pivots in accordance with a sink-and-float operation, a connecting rod whose one end is connected to the pivoting other end of said sensing lever, and a stopper lever, which, when one end of the stopper lever is connected to the other end side of said connecting rod and said sensing roller comes into contact with the leading work support causes a trailing work support to be limited to provide a predetermined storage conveying interval.

EFFECTS OF THE INVENTION

Since a transfer conveyor of the present invention comprises a conveyor driving mechanism, which mounts a number of works to be conveyed on a conveyor having a length shorter than the length of the article to be conveyed and is storage-conveyed on a conveyor track, the conveyor is miniaturized and reduced in weight so that conveying energy can be reduced, and at the same time the space below the mounted work is increased so that various step treatment during conveyance can be easily attained, and particularly when the transfer conveyor is used in a painting line of car bodies or the like, the amount of carried out paint excessively adhered to the conveyor is reduced so that a paint consumption efficiency can be significantly improved and not only heat capacity of a drying furnace can be reduced in accordance with the miniaturization of a conveying skid but also the following effects can be obtained by a peculiar device construction according to the present invention.

That is according to the transfer conveyor of the present invention, the collision preventing mechanism includes a sensing roller, which comes into contact with a leading work support in the transfer path on the conveyor track and sinks, a sensing lever, which rotatably pivots said sensing roller at one end and at the same time pivots in accordance with a sink-and-float operation, a connecting rod whose one end is connected to the pivoting other end of said sensing lever, and a stopper lever, which, when one end of the stopper lever is connected to the other end side of said connecting rod and said sensing roller, is displaced into the path of the trailing work support to limit its travel to a predetermined storage conveying interval, when works to be conveyed are storage-conveyed by use of a work support having a length shorter than the length of a work to be conveyed, a sensing roller, which comes into contact with a leading work support and is deflected, causes a stopper lever to arise into the transfer path through the sensing lever and the connecting rod and it operates to control and limit the travel of the trailing work support. That is the sensing roller exhibits a mechanical interlocking mechanism. Thus any interruption of a power supply of a control circuit, disconnection of a control wiring, malfunction of a control circuit and the like, which are liable to occur unexpectedly in electric interlocking mechanisms such as a driving control circuit and the like by a conventional magnetic material to be detected and a magnetostrictive sensor can be removed so that collision between works to be conveyed can be easily and reliably prevented.

Further, according to the transfer conveyor of the present invention, since, when a leading work support is reversely traveled to release the contact with a sensing roller in a maintenance operation or the like, the sensing roller, which is going to float onto the conveyor track, flattens a stopper lever, which traveling-limits the conveyor on a conveyor track through the sensing lever and connecting rod, reverse traveling of the conveyor can be easily attained without the need of incorporation of a driving control circuit for more complex and higher reverse traveling to an electric linking mechanism for a driving control circuit or the like by a conventional magnetic material to be detected and a magnetostrictive sensor.

BRIEF DESCRIPTION OF THE DRAWINGS

FIG. 6a is an operational view in the transfer conveyor of FIG. 1 showing a state just before the depression of the sensing element;

FIG. 6b is a view similar to FIG. 6a showing a state just after the depression of the sensing element;

DETAILED DESCRIPTION OF THE INVENTION

Figure 1:
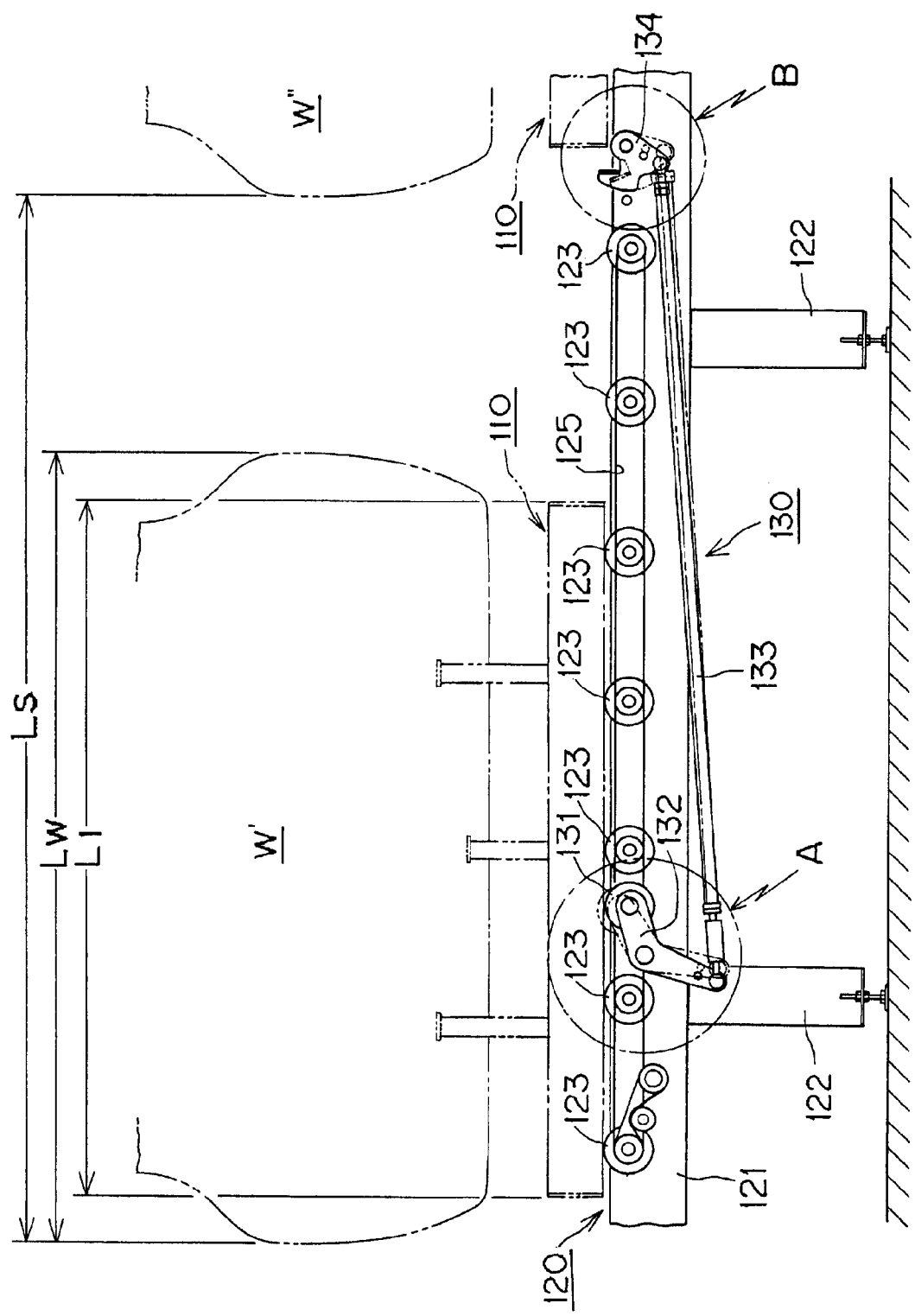
FIG. 1 is a side view showing a transfer conveyor of a first embodiment of the present invention showing the sensing element in the deflected position in full lines, and in the elevated contact position in broken lines.

The transfer conveyor according to the present invention easily and reliably prevents the collision between works to be conveyed in storage conveyance by use of the conveyor having a length shorter than the length in the coveting direction of the works to be conveyed, and at the same time it easily permits reverse traveling in a maintenance operation or the like, by the fact that the transfer conveyor comprises driven wheels which provide a work support driving mechanism which mounts a series of work supports. Each work support has a length shorter than the length of the work to be conveyed (in the conveying direction) and is stored or conveyed on a conveyor track. The conveyor has a collision preventing mechanism, which prevents collision between the work on a leading support of the series, and work on the next trailing support. The mechanism includes a sensing device in the form of a roller, which comes into contact with a leading work support on the conveyor track and is deflected, a sensing lever, which rotatably mounts the sensing roller at one end and at the same time pivots in accordance with the contact-and-deflect operation, a connecting rod whose one end is connected to the other end of said pivoting sensing lever, and whose other end is connected to a stopper lever downstream of said sensing lever. When the sensing device is deflected by the leading work support, the stopper lever is pivoted into the path of the next trailing work support on the conveyor track to cause the trailing traveling work support to be stopped on the conveyor track so as to limit the travel of the trailing work support to a predetermined storage conveying interval.

With a work support, which mounts works to be conveyed, according to the present invention, if the work support has a form including a sled-shaped skid, which travels into contact with a sensing roller for actuating the collision preventing mechanism, any type of work support may be used, such as a conveying skid composed of a rectangular frame body and the like, or a hybrid type conveying cart including such a conveying skid and traveling wheels.

"A predetermined storage conveying interval" in the present invention may be a storage conveying interval sufficient to avoid the collision between works to be conveyed, which are sequentially continuously conveyed. The rod length of the connecting rod determines the storage conveying interval preferred. However, for example, when the work to be conveyed is a car body disposed longitudinally of the conveyance direction, the storage conveying interval required is longer than when the work is disposed laterally, and an additional rod, which supplements a predetermined rod length of a connecting rod may be provided through a relay lever.

A transfer conveyor, which is an example of the present invention, storage-conveys works to be conveyed on a painting line, and will be described with reference to drawings. FIGS. 1-6 illustrate a first example according to the present invention, and FIGS. 7-11 illustrate a second example according to the present invention.

Figure 2:
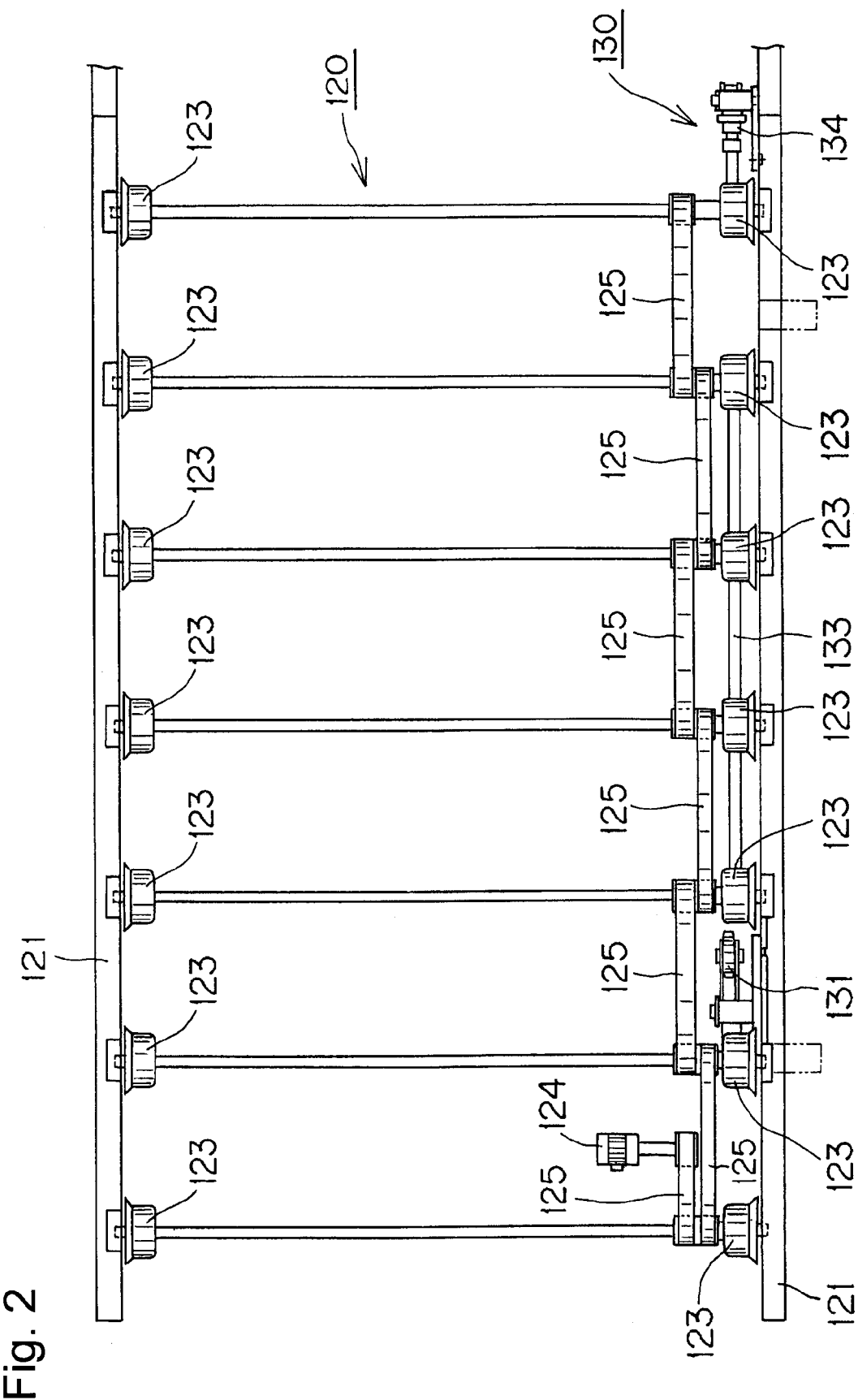
FIG. 2 is a plan view of FIG. 1.

As shown in FIGS. 1 and 2, a transfer conveyor 100 of a first example according to the present invention comprises a work support driving mechanism 120, which mounts a series of works W to be conveyed, in the present instance a car body, to a work support 110 composed of a conveying skid and stores or conveys it on a conveyor track 121. A collision preventing mechanism 130 prevents collision between a leading work W' of the series to be conveyed and a trailing work W" to be conveyed, which are stored or conveyed by the work support driving mechanism 120. In the illustrated embodiment, the conveyor 100 stores or conveys car bodies on a painting line for the car bodies.

Figure 3:
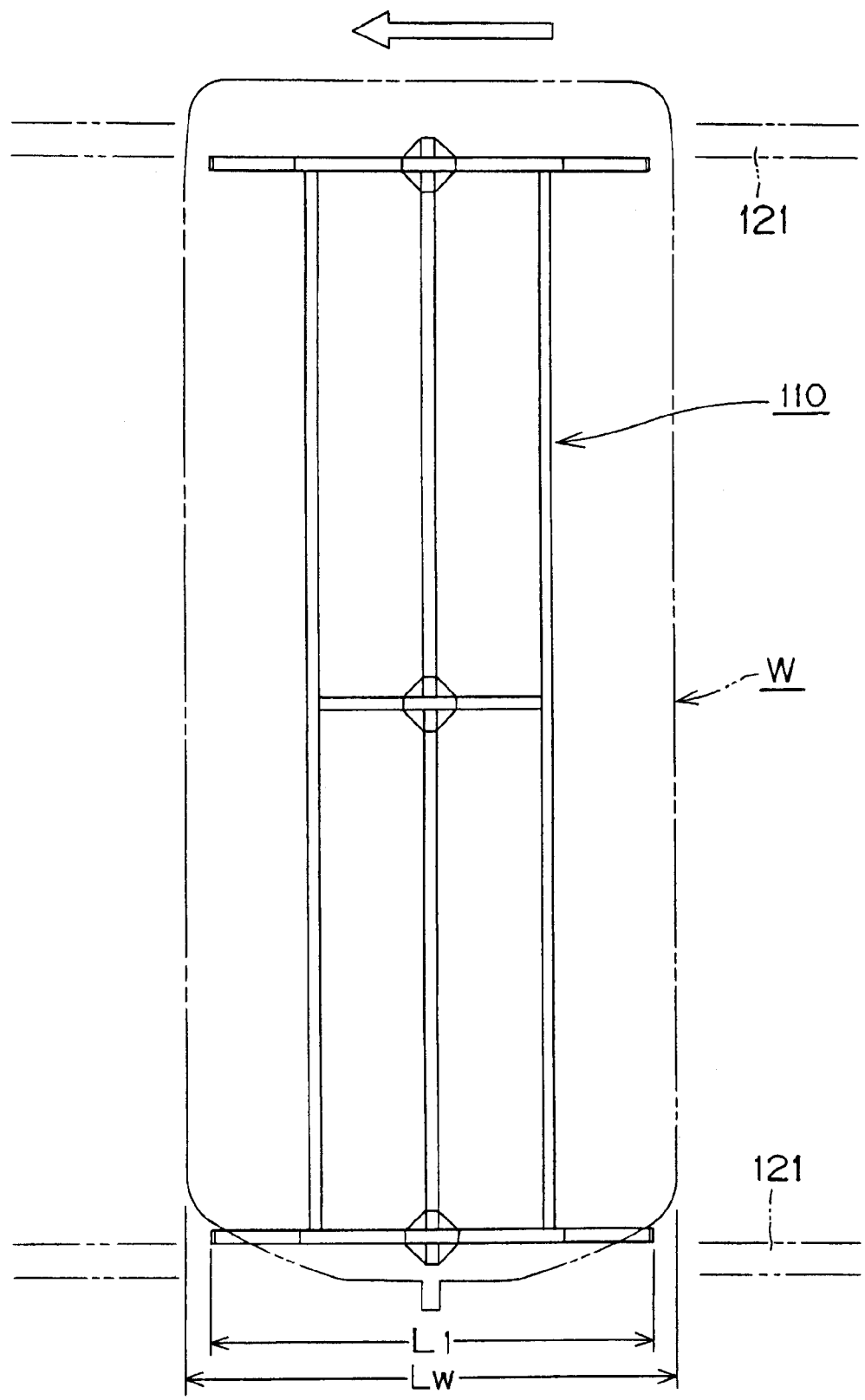
FIG. 3 is a plan view showing a lateral conveyance state of a work support used in the first embodiment of the present invention.

As shown in FIG. 3, the work support 110 used in the transfer conveyor 100 of the example conveys the work W laterally as shown in an arrow, and is formed of a conveying skid of a rectangular frame body having the length L1 shorter than the length Lw of the work W to be conveyed in a conveying direction (both lengths in the direction of conveyance).

Such work support 110 realizes a reduction in conveying energy based on miniaturization and reduction in weight and at the same time sufficiently ensures space below the work W to be conveyed composed of a mounted car body and easily allows various step treatments during conveyance. Particularly, the amount of carried out paint excessively adhered to the work support 110 is reduced so that paint consumption efficiency can be significantly improved and heat capacity of a drying furnace can be reduced in accordance with the miniaturization of a conveying skid.

Further, in the work support driving mechanism 120 used in the transfer conveyor 100 of the present example, as shown in FIG. 2, a pair of sections of the track 121 are constructed between a plurality of supporting brackets 122, which are upright provided on a floor surface of a conveying line at predetermined intervals along the conveying direction, and a number of driven rollers 123 are incorporated along the pair of sections of the track 121. These rollers 123 are adapted to come into sliding contact with a bottom surface of the work support 110 composed of a conveying skid so as to be driven.

It is noted that the reference numeral 124 in FIG. 2 denotes a driving motor and the reference numeral 125 is a staggered driving belt for driving a number of driving rollers 123 by a driving motor 124.

Next the most characteristic mechanism of the transfer conveyor 100 of the present example, that is a collision preventing mechanism 130, which prevents the collision between a leading work W' to be conveyed and a trailing work W" to be stored or conveyed, will be described in detail below based on FIGS. 2 to 6.

That is the collision preventing mechanism 130 used in the transfer conveyor 100 of the present example comprises a polyurethane sensing roller 131, which is biased into a contact position contacting the leading work support 110 on the conveyor 123 of the track 121 and is deflected downwardly. A bell crank sensing lever 132, which rotatably mounts this sensing roller 131 at one end and pivots in accordance with a contacting/deflecting operation of the sensing roller 131. An elongated connecting rod 133 has one end connected to the pivoting other end of this sensing lever 132, and its opposite end connected to a hook-shaped stopper lever 134 mounted for displacement into the path of the trailing work support downstream of the sensing lever. When the sensing roller 131 comes into contact with a leading work support 110, and is deflected, the stopper lever 134 is projected into the transfer path of the trailing work support 110 in the transfer path on the conveyor track so as to limit its travel to a predetermined storage conveyance interval Ls.

It is noted that the reference numeral 134a (FIG. 5) denotes a buffer member composed of an elastic body for reducing the shock in limiting the travel of the work support 110.

Further, "a predetermined storage conveyance interval Ls" in a transfer conveyor 100 of the present example is set to a storage conveyance interval sufficient to avoid the collision between works W to be conveyed, which are continuously conveyed. The interval Ls is larger than the length Lw of a work W to be conveyed in a conveyance direction. The interval Ls is determined by the distance between the sensing element 130 and the stopper lever 134, which in the illustrated embodiments corresponds to the length of the track sections 121.

Figure 4:
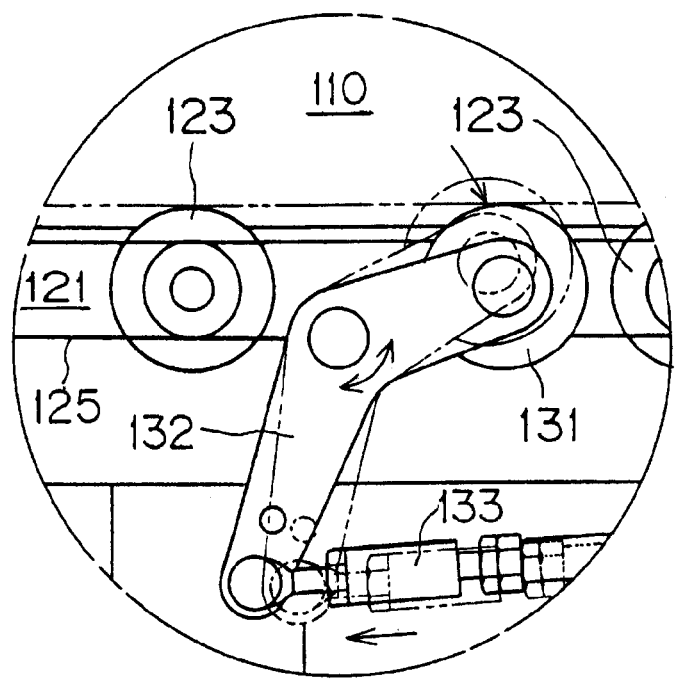
FIG. 4 is an enlarged view of a portion A of FIG. 1.
Figure 5:
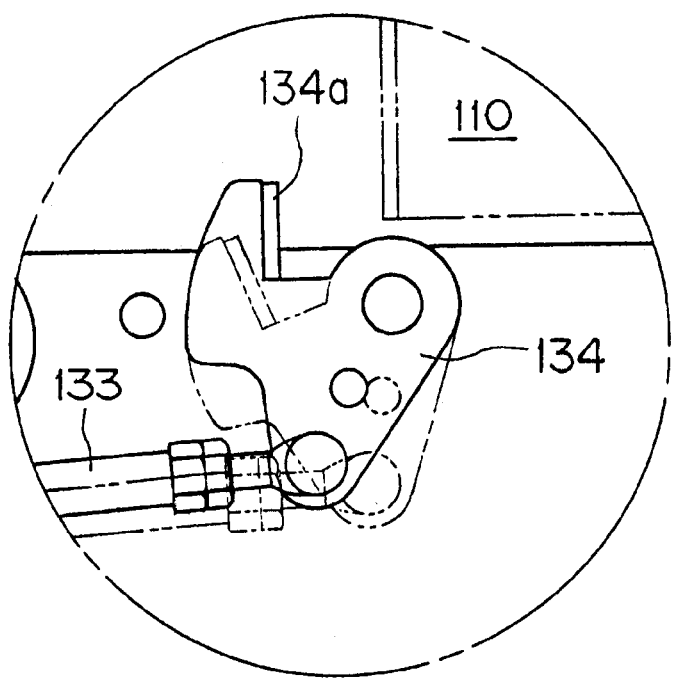
FIG. 5 is an enlarged view of a portion B of FIG. 1.

Therefore, in storing or conveying the work W to be conveyed by use of the work support 110 having a length shorter than the length of the work W to be conveyed as shown in FIG. 6, when a leading work support 110 comes into traveling contact with a sensing roller 131 to deflect the sensing roller 131 as shown in FIGS. 2 and 4, the above-mentioned collision preventing mechanism 130 exhibits a mechanical linking mechanism so that the sensing lever 132 is pivoted in a direction of the arrow and draws the connecting rod 133 in a direction of conveyance, as shown in FIGS. 2 and 5, the connecting rod 133 pivots the stopper lever 134 in a direction of the arrow to cause it to be displaced into the transfer path of travel of the trailing work support on the conveyor track to limit the travel of the trailing work W.

Figure 13:
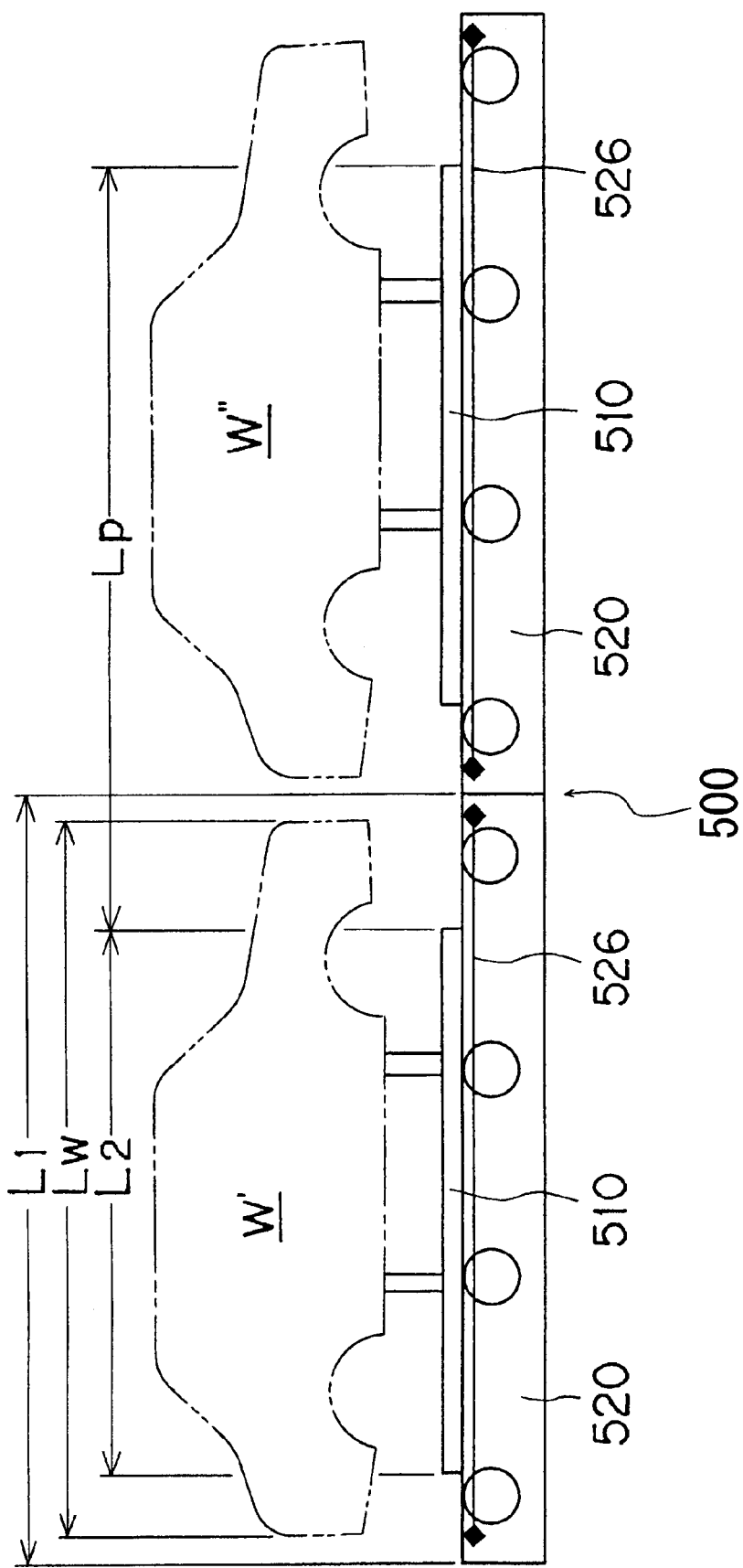
FIG. 13 is a diagrammatic view showing a conventional transfer conveyor.
Figure 14:
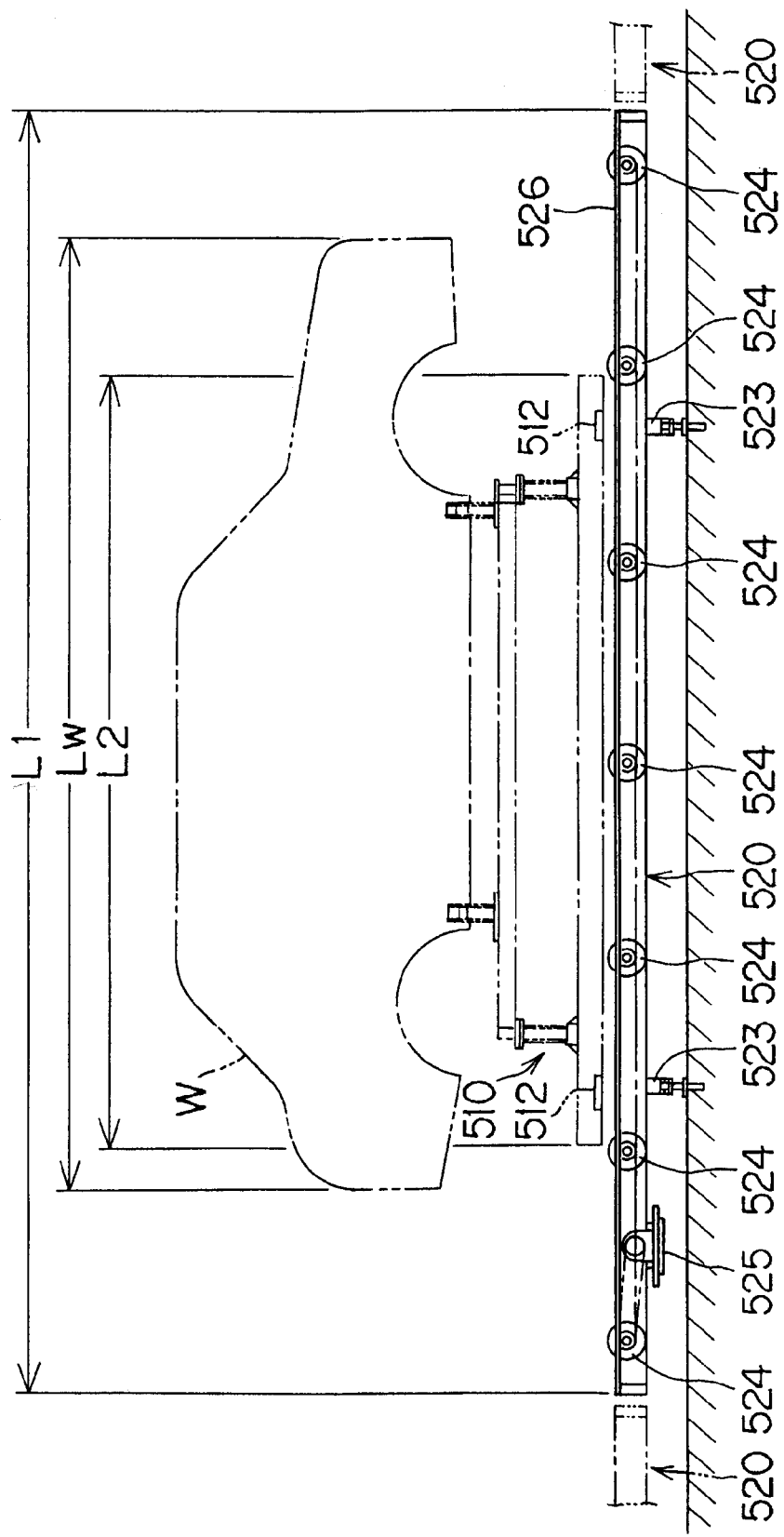
FIG. 14 is an explanatory view of the conventional conveyor of FIG. 13.

In the thus obtained transfer conveyor 100 of the present example, since the collision preventing mechanism 130 mechanically links the sensing roller 131, which comes into contact with the leading work support 110, and the stopper lever I 134, which limits the travel of the work support 110, the present invention avoids the ill effects of interruption of a control circuit power supply, disconnection of a control wiring, malfunction of a control circuit and the like, which are liable to occur unexpectedly in a prior art electric linking mechanism such as a driving control circuit by a magnetic material 512 to be detected and a magnetostrictive sensor 526 as in the conventional case illustrated in FIGS. 13 and 14, and collision between works to be conveyed composed of car bodies can be easily and reliably prevented. When a leading work support 110 is reversely traveled to release the contact with a sensing roller 131 in a maintenance operation or the like, the sensing roller 131, which returns to the contact position on the conveyor track, displaces the stopper lever 134 out of the path of travel of the work support 110 on the conveyor track through the sensing lever 132 and connecting rod 133. Thus, reverse traveling of the work support 110 can be easily done without the need of incorporation of a driving control circuit for more complex and higher reverse traveling to an electric linking mechanism for a driving control circuit or the like by a conventional magnetic material 512 to be detected and a magnetostrictive sensor 526. Thus the advantageous effects of the example are very large.

Figure 7:
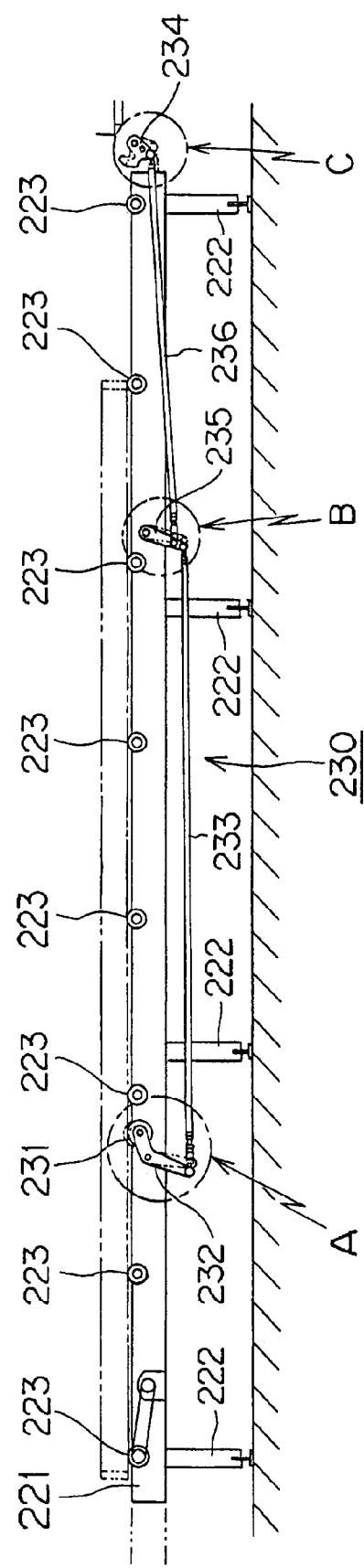
FIG. 7 is a side view similar to FIG. 1, showing a second embodiment of the present invention.
Figure 8:
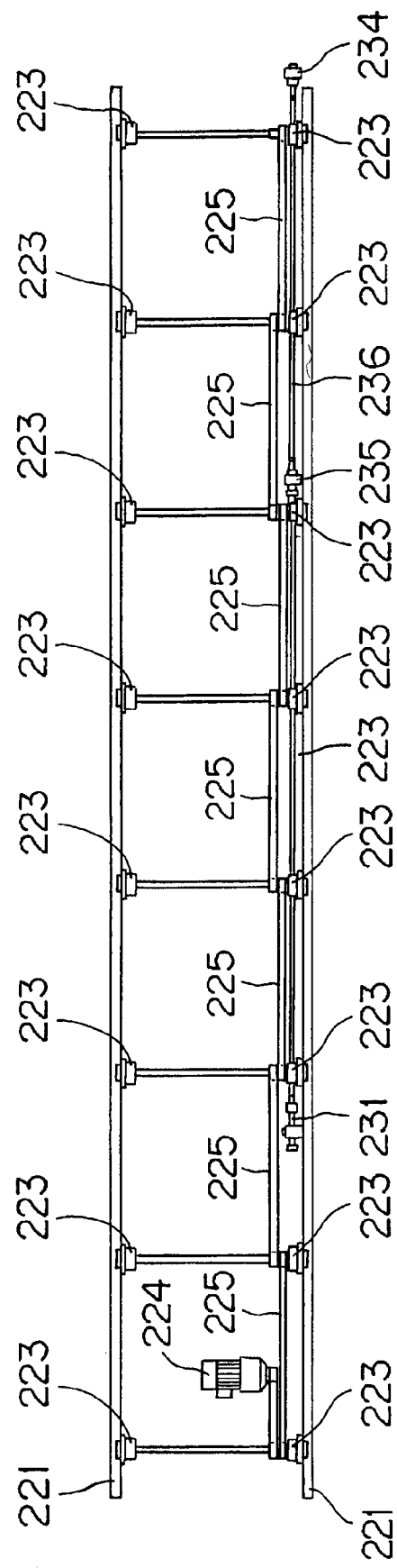
FIG. 8 is a plan view of FIG. 7.

Next, as shown in FIGS. 7 and 8, a transfer conveyor 200 of a second example according to the present invention comprises a conveyor driving mechanism 220, which mounts a work W to be conveyed composed of a car body to a work support 210 composed of a conveying skid and stores or conveys it on a conveyor track. A collision preventing mechanism 230 prevents collision between a leading work W to be conveyed and a trailing work W to be conveyed, which are stores or conveyed by the conveyor driving mechanism 220, and stores or conveys the work W to be conveyed composed of a car body in a painting line for car bodies.

Figure 9:
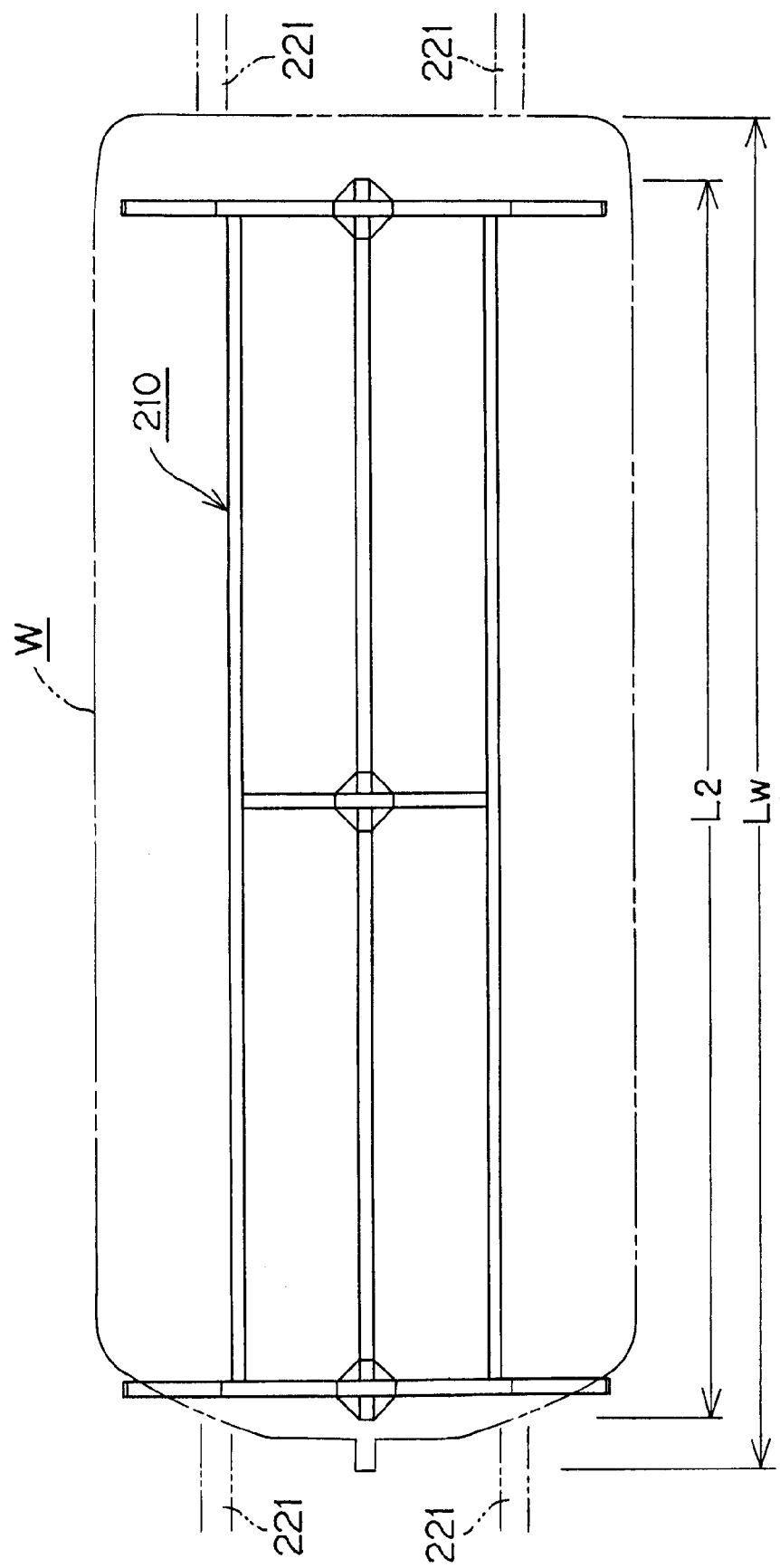
FIG. 9 is a plan view showing a longitudinal conveyance state of a conveyor used in the second embodiment of the present invention.

As shown in FIG. 9, the work support 210 used in the transfer conveyor 200 of the example conveys the work W to be conveyed composed of a car body longitudinally as shown in an arrow, and is formed of a conveying skid of a rectangular frame body having a length L2 shorter than the length Lw of the work W in the conveying direction.

It is noted that the work support 210 used in the transfer conveyor 200 of the example has only different conveyance direction from the work support 110, which conveys the work W to be conveyed laterally as shown in FIG. 3, and other points are quite the same as the above-mentioned work support 110.

And such a work support 210 realizes a reduction in conveying energy based on miniaturization and reduction in weight and at the same time sufficiently ensures space below the work W to be conveyed and easily allows various step treatments during conveyance. Particularly, the amount of carried out paint excessively adhered to the work support 210 is reduced so that a paint consumption efficiency can be significantly improved and heat capacity of a drying furnace can be reduced in accordance with the miniaturization of a conveying skid.

Further, in the conveyor driving mechanism 220 used in the transfer conveyor 200 of the present example, as shown in FIG. 8, a pair of unit frames 221 are constructed between a plurality of supporting brackets 222, which are upright on a floor surface of a conveying line at predetermined intervals along the conveying direction, and a number of driven rollers 223 are incorporated along the pair of unit frames 221. These rollers 223 are adapted to come into sliding contact with a bottom surface of the work support 210 composed of a conveying skid so as to drive the supports 210 along the path of conveyance.

It is noted that the reference numeral 224 in FIG. 8 denotes a driving motor and the reference numeral 225 is a staggered driving belt for driving a number of driving rollers 223 by a driving motor 224.

Next the most characteristic mechanism of the transfer conveyor 200 of the present example, that is a collision preventing mechanism 230, which prevents the collision between a leading work W to be conveyed and the next trailing work W to be conveyed, which are stored or conveyed, will be described in detail below based on FIGS. 8 to 12.

That is the collision preventing mechanism 230 used in the transfer conveyor 200 of the present example comprises a polyurethane sensing roller 231, which is biased into a contact position contacting with the leading work support 210 on a conveyor track and is deflected. A bell crank sensing lever 232 rotatably mounts this sensing roller 231 at one end and pivots in accordance with a contacting/deflecting operation of the sensing roller 231. A string of at least two connecting rods connects the sensing lever 232 to a bell crank stopper lever 234. An elongated connecting rod 233 has one end connected to the pivoting other end of this sensing lever 232. An additional rod 236 is connected to the other end of this connecting rod 233 through a relay lever 235 and to the hook-shaped stopper lever 234. When the sensing roller 231 comes into contact with the leading work support 210, the stopper lever 234 is displaced into the path of the trailing work support 210 on the conveyor track to limit its travel to a predetermined storage conveyance interval Ls. It should be noted that the weights of the two bell crank levers 232 and 234, the string of connecting rods 233, 236, and the stopper 234 cooperate to provide a bias which tends to displace the sensing roller towards its elevated contact position. Passage of the leading work support 210 over the roller 231 overcomes the bias and displaces the roller to its deflected position shown in FIG. 7, and through the string of connecting rods displace the stopper 234 to its operative position shown. A similar bias is provided by the weights of the two bell crank levers 132 and 134, the connecting rod 133 and the stopper 134, as shown in FIG. 1, which is overcome when the work support 110 passes over the sensing roller 131.

It is noted that the reference numeral 234a denotes a buffer member composed of an elastic body for reducing the shock in traveling limiting of a work support 210.

Further, a predetermined storage conveyance interval Ls in a transfer conveyor 200 of the present example is set to a storage conveyance interval sufficient to avoid the collision between works W to be conveyed, which are continuously conveyed, that is an interval larger than a length Lw of a work W to be conveyed in a conveyance direction.

Figure 10:
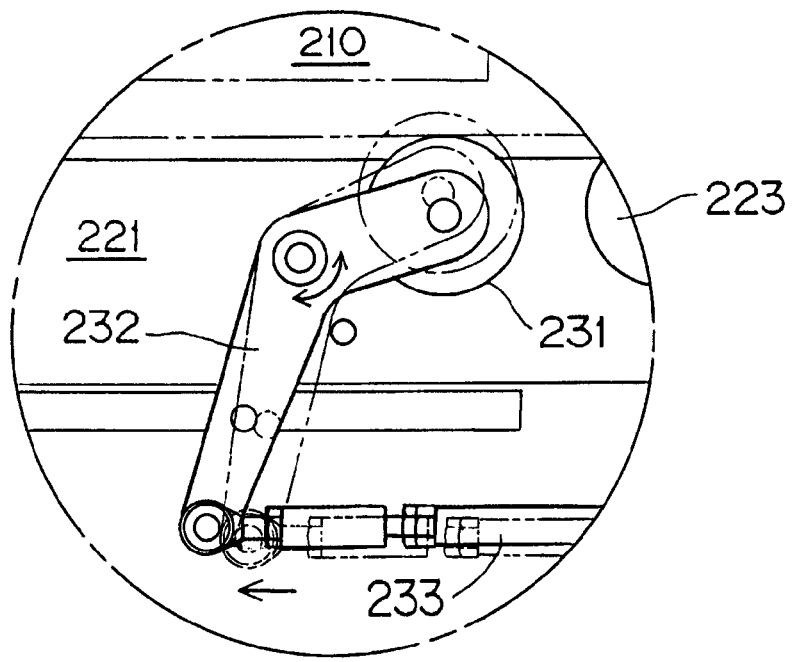
FIG. 10 is an enlarged view of a portion A of FIG. 7.
Figure 11:
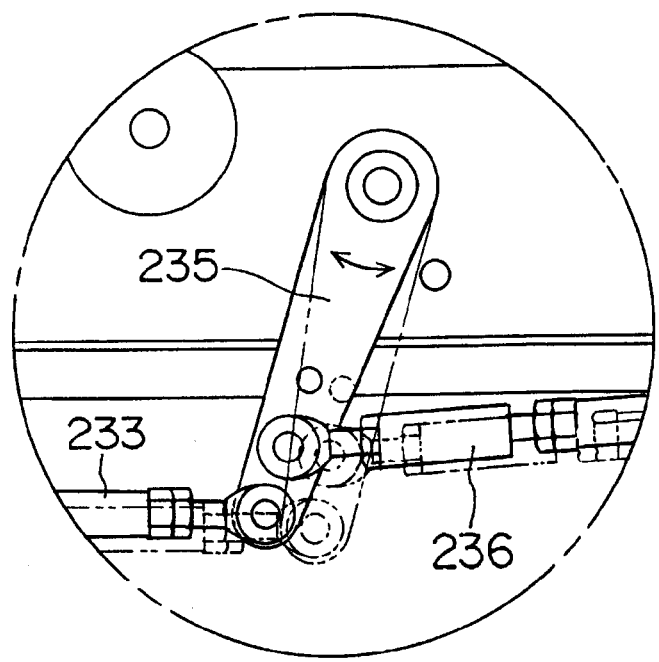
FIG. 11 is an enlarged view of a portion B of FIG. 7.
Figure 12:
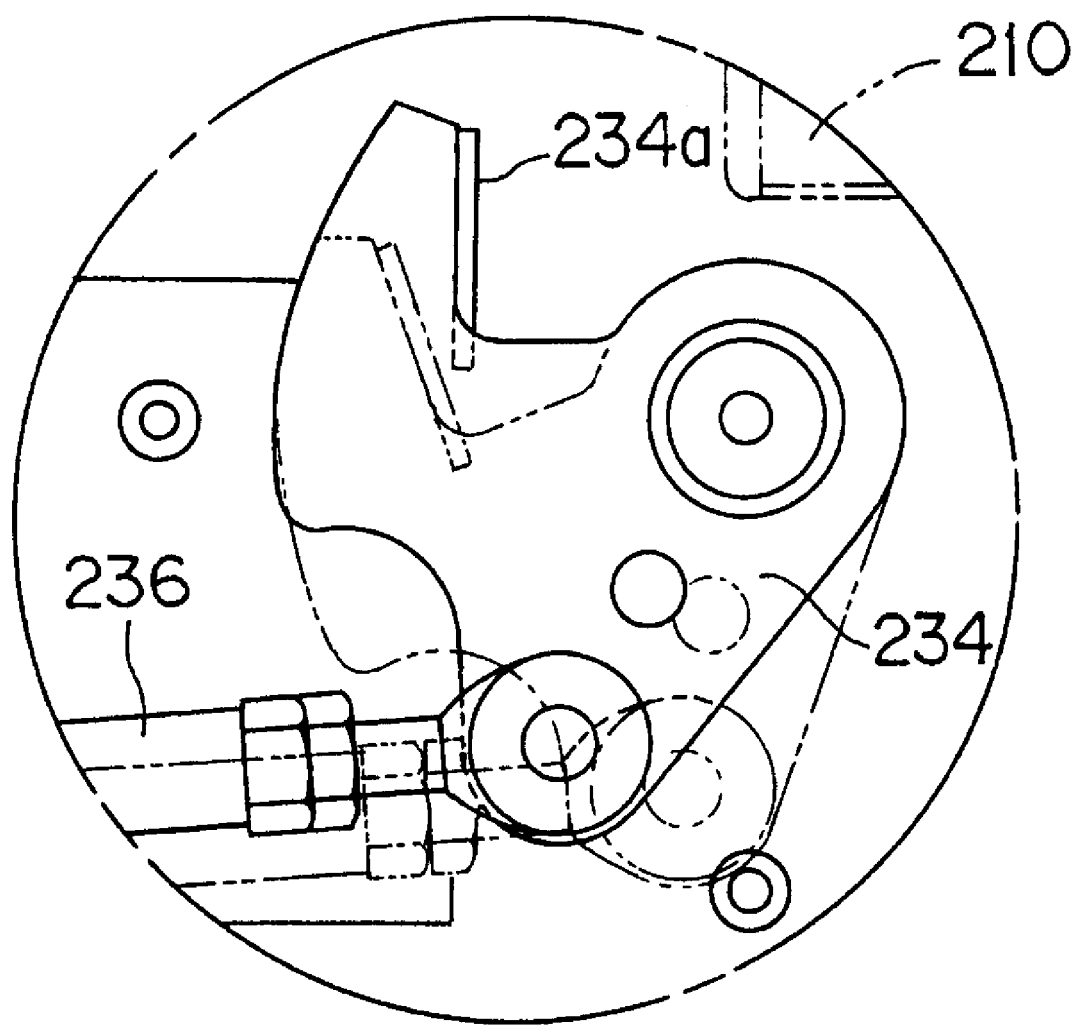
FIG. 12 is an enlarged view of a portion C of FIG. 7.

Therefore, in storing or conveying the work W to be conveyed by use of the work support 210 having a length shorter than the length of the work W to be conveyed as shown in FIG. 6, when the leading work support 210 comes into traveling contact with a sensing roller 231 to deflect the sensing roller 231 as shown in FIGS. 8 and 10, the above-mentioned collision preventing mechanism 130 exhibits a mechanical linking mechanism so that the sensing lever 232 is pivoted in a direction of the arrow and draws the string of connecting rods in a direction of conveyance as shown in FIGS. 8 and 11. The string of connecting rods includes the rod 233 and the additional rod 236, which supplements the length of the connecting rod 233 through a relay lever 235. As shown in FIGS. 8 and 12 the additional rod 236 pivots a stopper lever 234 in a direction of the arrow to cause it to be displaced into the transfer path of the trailing work support on the conveyor track and consequently the travel of the support 210 is limited.

In the thus obtained transfer conveyor 200 of the present example, the collision preventing mechanism 230 mechanically links a sensing roller 231, which is biased into contact with the leading work support 210, and a stopper lever 234, which limits the travel of the work support 210. The present invention avoids the ill effects of interruption of a control circuit power supply, disconnection of a control wiring, malfunction of a control circuit and the like, which are liable to occur unexpectedly in a prior art electric linking mechanism such as a driving control circuit by a magnetic material 512 to be detected and a magnetostrictive sensor 526 as in the conventional case illustrated in FIGS. 13 and 14. In a maintenance operation or the like, the leading work support 210 may be reversely traveled to release its contact with a sensing roller 231, In such case, the sensing roller 231, which is going to rise into the contact position above the conveyor track, displaces a stopper lever 234, which traveling-limits the work support 210 from the conveyor track through the sensing lever 232 and connecting rod 233. Thus, reverse traveling of the work support 210 can be easily achieved without the need of incorporation of a driving control circuit for more complex and higher reverse traveling to an electric linking mechanism for a driving control circuit or the like by a conventional magnetic material 512 to be detected and a magnetostrictive sensor 526. Thus the advantageous effects of the example are very large.

The invention claimed is:

1. A conveyor for transferring and storing a number of works comprising a conveyor track, conveyor driving mechanism, a series of work supports adapted to move in a transfer path on said conveyor track, each support having a length shorter than the length of the works, and a collision-preventing mechanism which prevents collision between the work on the leading work support of said series and the work on a trailing work support of said series, characterized in that said collision-preventing mechanism includes a sensing roller, displaceable between an elevated contact position in said transfer path, where it is adapted to contact the work support of the leading work of said series on said conveyor track, and a deflected position into which the roller is deflected by said contact with the leading work support, a sensing lever rotatably mounting said sensing roller at one end and operable to displace the roller between said contact and deflected positions, a string of at least two connecting rods connected by at least one intermediate connecting lever, said string having one end connected to the other end of said sensing lever, and a stopper lever connected to the other end of said string of connecting rods and operable upon deflection of said roller to be displaced into the transfer path of said trailing work support of the series to limit travel of said trailing work support to maintain at least a predetermined conveying interval between said leading and trailing works.

2. A conveyor for transferring and storing a number of works comprising a conveyor driving mechanism, a series of work supports, each having a length shorter than the length of the works, a conveyor track to support said series of work supports for travel in a transfer path, and a collision-preventing mechanism which prevents collision between the work on the leading work support of said series and the work on a trailing work support of said series, characterized in that said collision-preventing mechanism includes

- a sensing roller, operable to be displaced between an elevated contact position in said transfer path, where it is adapted to contact the work support of the leading work of said series on said conveyor track, and a deflected position into which the roller is deflected by said contact with the leading work support,
- a sensing bell crank lever rotatably mounting said sensing roller at one end, operable to pivot the roller between the contact and deflected positions,
- connecting rod means having one end connected to the other end of said sensing bell crank lever,
- a stopper bell crank lever connected to the other end of said connecting rod means and having a stopper operable upon deflection of said roller to be displaced into the path of said trailing work support of the series to limit travel of said trailing work support to maintain at least a predetermined conveying interval between said leading and trailing works, the weights of said bell crank levers, said connecting rod means and said stopper biasing said sensing roller towards its elevated position in said transfer path, said bias being overcome by the passage of the leading work support over the sensing roller in its elevated position.

3. A conveyor according to claim 2, comprising a plurality of track sections providing said transfer path for said works, each section comprising a plurality of driven wheels and having a length greater than the length of the works being conveyed, and conveyor driving mechanism for driving said driven wheels.

4. A conveyor according to claim 2, wherein said stopper lever is mounted upstream from said sensing element by a distance greater than the length of the works being conveyed.

5. A conveyor according to claim 2, wherein said connecting rod means means comprises at least two connecting rods interconnected by at least one connecting lever.

6. A conveyor according to claim 3, wherein said stopper lever is mounted upstream from said sensing element by a distance equal to the length of said track sections.

7. A conveyor according to claim 2, wherein said connecting rod means consists of a single connecting rod connecting said two bell crank levers.

* * * * *